May 31, 1932.  F. R. ZIMMERMAN  1,860,699
SPRING ASSEMBLY
Filed Dec. 31, 1929
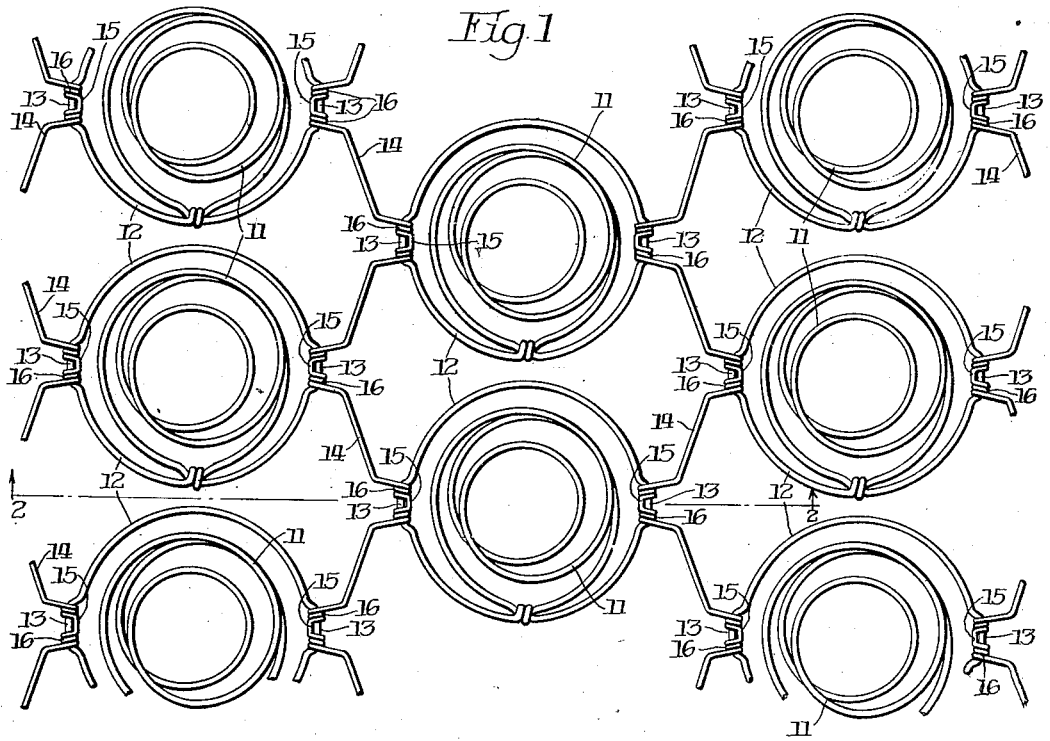
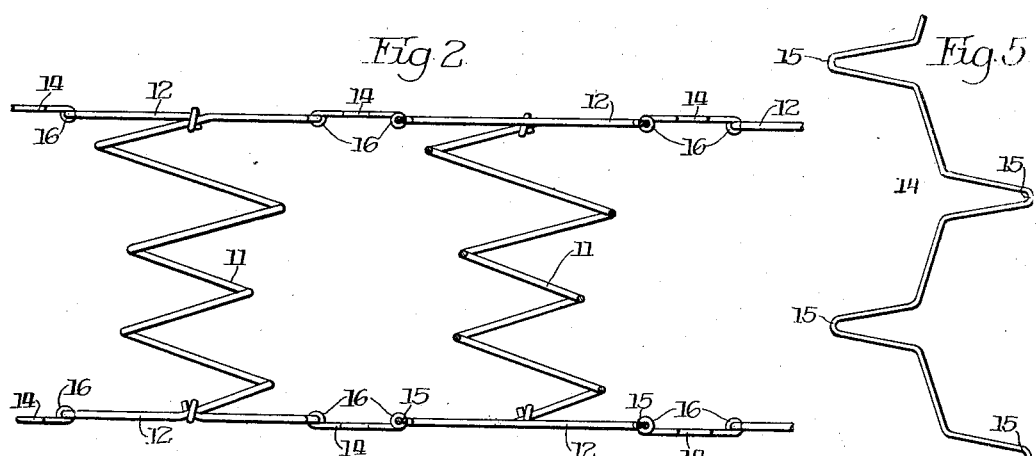
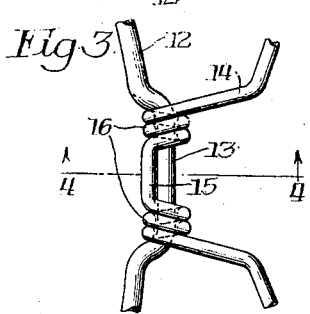
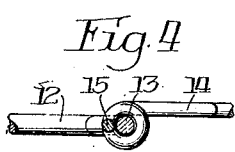
Inventor:
Fred R. Zimmerman
By Walter M. Fuller Atty Patented May 31, 1932

1,860,699

UNITED STATES PATENT OFFICE

FRED R. ZIMMERMAN, OF CHICAGO, ILLINOIS, ASSIGNOR, BY MESNE ASSIGNMENTS, TO BURTON-DIXIE CORPORATION, OF CHICAGO, ILLINOIS, A CORPORATION OF DELAWARE

SPRING ASSEMBLY

Application filed December 31, 1929. Serial No. 417,668.

The present invention relates to spring structures or spring assemblies, such as are used in mattresses, cushions, bed-springs, etc., one of the leading objects of the invention being the provision of a construction of this general character which is simple in design, which is relatively economical to manufacture, and which possesses unusual resiliency without likelihood of detrimental or objectionable displacement or dislodgment of the springs.

Although not limited to such employment, the new type of spring construction is well adapted for use in spring mattresses associated with suitable padding or filling.

Spring assemblies of this character ordinarily embody a number of upright, coiled springs and this invention concerns more particularly the means for tying or connecting the end coils of such springs together in a manner to interfere in minimum degree in the performance of their cushioning functions.

To enable those acquainted with this art to fully understand the invention, both from structural and operating standpoints, in the accompanying drawings, forming a part of this specification and to which reference should be had in connection with the following detailed description, a present, desirable or preferred embodiment of the invention has been presented, and, for simplicity, like reference numerals have been employed to designate the same parts throughout the several views.

In the drawings:—

Figure 1 is a fragmentary, top, plan view of a portion of the spring assembly;

Figure 2 is a vertical section on line 2—2 of Figure 1;

Figure 3 is an enlarged plan of one of the hinge connections of the tying or connecting wire with the the top coil of one of the upright, cushion springs;

Figure 4 is a cross-section on line 4—4 of Figure 3; and

Figure 5 is a plan of a portion of one of the connecting or uniting wires before it is applied or hinged to the end rings of the vertical springs.

As is frequent in spring-cushions of this style, the new one illustrated includes a plurality of rows of erect, hour-glass, coiled springs 11, 11 arranged in the staggered relation depicted, whereby the springs of any row are in offset position with reference to those of the two rows on the opposite sides thereof.

The top and the bottom coils or convolutions of such springs are connected together in like manner, so that a description of the way of joining the top coils together will be adequate.

As is fully illustrated, the round, end coil or ring 12 of each such spring is offset at two, diametrically-opposite points to provide a pair of short, parallel, straight sections 13, 13 to afford bearings for the associated, connecting or joining wires 14, 14.

Each such wire 14, before being applied and secured to the cushion-springs, is of the zigzag or wavy form presented in Figure 5 with spaced projections 15, 15 extending alternately in opposite directions.

Each connecting wire, as shown, joins together the springs of two adjacent rows, being in turn connected to the spring of one row, then to the proximate one of the next row, and then to the adjoining one of the first row, and so on.

In attaching each such wire 14 to the end coils or rings of the springs, the projections 15 are wound around the parts 13 about two times, forming the convolutions 16 which thus hinge the wire to the various end-coils, the parts 16 being free or loose enough to turn or rock on the sections 13.

Because of this hinged relation between the connecting wires and the springs, the latter may flex with great freedom and without substantial resistance from the neighboring springs to which they are thus rockingly connected.

The attachments of each connecting wire to the springs cannot shift longitudinally on the parts 13 and their turning movements thereon occur with substantial exemption from restraint and without noise.

Thus the various sections of the spring-cushion may be depressed or compressed locally and may return to normal position with ease and facility giving the cushion, as a whole, marked resiliency and unusual elasticity.

Where a spring assembly of this kind is employed in a mattress, which is more or less frequently reversed or turned upside down on the bed, it lends itself admirably to such use, both sides of the spring structure being constructed in the same manner.

The principles of construction embodied in the spring shown and described may also be employed to advantage and benefit in bed-springs in which the lower ends of the upright springs are anchored in place and in which the spring is not adapted for use in reversed position.

Those trained in this art will readily understand that the invention is not limited and restricted to the precise and exact details of structure shown and described and that these may be modified within a comparatively wide range without departure from the heart and essence of the invention, as defined by the appended claim, and without the loss or sacrifice of any of its substantial benefits or advantages.

In the example shown, the wires 14 extend over the tops of the end-coils 12 and are then wrapped or wound around the sections 13, but, if preferred, the wires 14 may extend below the top-coils 12 and be in similar manner twisted around the parts 13 to form the hinges.

I claim:—

In a spring-assembly, the combination of a plurality of rows of upright cushion coiled springs with end-coils with the springs of adjacent rows in staggered relation, and tie-wires of general wave form alternately hingedly connected to the end-coils of the springs of adjacent rows in sequence, each such end-coil having two such hinge connections at diametrically opposite points, each such end-coil at such hinge points being deformed to provide substantially straight portions encircled by double-wire laterally offset parts of the tie-wires coiled around said straight portions and providing within the coils practically-round openings of substantially the diameter as the wire of such straight sections to form the hinges, each of said hinges being capable of turning practically-equally freely in either of two opposite directions, such tie-wire coiled portions co-operating with the bends in the spring end-coils at the ends of said straight sections to prevent substantially relative axial shifting of the parts of the hinges.

In witness whereof I have hereunto set my hand.

FRED R. ZIMMERMAN.